United States Patent [19]

Shew

[11] Patent Number: 6,032,922

[45] Date of Patent: Mar. 7, 2000

[54] FLUID FLOW CONTROL VALVE AND ACTUATING MECHANISM

[75] Inventor: Jerry D. Shew, Charlotte, N.C.

[73] Assignee: Alemite Corporation, Charlotte, N.C.

[21] Appl. No.: 08/763,200

[22] Filed: Dec. 10, 1996

[51] Int. Cl.[7] .......................... F16K 31/524; F16K 31/60; F16K 35/02

[52] U.S. Cl. .................................. 251/99; 74/54; 74/523; 74/529; 74/567; 74/569; 239/526; 251/103; 251/104; 251/107; 251/109; 251/239; 251/243; 251/244; 251/263

[58] Field of Search ................................ 239/480, 526, 239/530; 251/102, 103, 104, 107, 108, 109, 242, 243, 244, 245, 246, 251, 263, 99; 74/519, 523, 524, 54, 567, 569

[56] References Cited

U.S. PATENT DOCUMENTS

| | | | |
|---|---|---|---|
| 813,110 | 2/1906 | Norling | 251/111 |
| 927,593 | 7/1909 | Phillipson | 251/239 |
| 1,125,521 | 1/1915 | Harrison | 173/169 |
| 1,173,672 | 2/1916 | Macloskie | 251/239 |
| 1,314,195 | 8/1919 | Jarvis | 251/239 |
| 2,009,845 | 7/1935 | Farmer | 251/132 |
| 2,213,748 | 9/1940 | Stettner | 158/27.4 |
| 2,247,099 | 6/1941 | Rice | 251/263 |
| 2,362,946 | 11/1944 | Stockdale | 239/480 |
| 2,372,392 | 3/1945 | Pletman | 251/239 |
| 2,416,719 | 3/1947 | Stockdale | 299/112 |
| 2,519,283 | 8/1950 | Pulver | 239/480 |
| 2,525,615 | 10/1950 | Peck | 251/115 |
| 2,541,073 | 2/1951 | Kaufman | 169/31 |
| 2,544,556 | 3/1951 | Kunert | 251/239 |
| 2,884,004 | 4/1959 | Dierdorf | 137/522 |
| 2,942,622 | 6/1960 | Hahn et al. | 251/263 |
| 3,016,226 | 1/1962 | Freeman | 251/109 |
| 3,016,929 | 1/1962 | Rapaport | 141/263 |
| 3,022,015 | 2/1962 | Burch | 239/530 |
| 3,249,123 | 5/1966 | Berg | 251/263 |
| 3,282,511 | 11/1966 | Barton | 239/480 |
| 3,390,921 | 7/1968 | Klimek | 303/56 |

(List continued on next page.)

FOREIGN PATENT DOCUMENTS

| | | | |
|---|---|---|---|
| 1156617 | 10/1958 | Germany . | |
| 3826784 | 2/1990 | Germany | 239/526 |
| 4324158 | 1/1994 | Germany | F16K 1/00 |
| 1047529 | 10/1983 | U.S.S.R. | 239/526 |
| 2129334 | 11/1982 | United Kingdom | B05B 9/01 |

OTHER PUBLICATIONS

Instructions–Parts List 307–965 (Rev A) for "Electronic Fluid Meter and Inline Metered Dispense Valves", Graco Inc., Minneapolis, MN, 55440–1441, 1988, pp. 1–11.

(List continued on next page.)

Primary Examiner—George L. Walton
Attorney, Agent, or Firm—Moore & Van Allen, PLLC; Michael G. Johnston

[57] ABSTRACT

A fluid flow control valve is provided comprising a valve seat inside a housing for defining a passage opening in the housing and a valve seal positioned against the valve seat for closing off fluid flow. A push rod extends from the valve seal and through the passage opening. The push rod is moveable for moving the valve seal off the seat to open the valve. The valve seal is restricted to substantially axial movement, preferably by a spring biasing the valve seal against the valve seat which spring is sized so as to engage the walls of the passage. A cam shaft rotatably mounted in the housing is provided for moving the push rod upon rotation of the cam shaft. A handle is non-rotatably connected to the shaft for rotating the cam shaft. A latch may be provided for releasably locking the handle in a position where the valve is open. A safety may also be provided on the latch arm so as to prevent the handle from being moved accidentally. A manipulator accessible through an opening in the handle operates to both effect engagement of the latch and release the safety. The valve is configured for maximizing fluid flow by allowing fluid to flow around the outside rather than through the inside of the valve assembly. Moreover, a substantial portion of the cam shaft is positioned out of the passage to maximize fluid flow around the shaft when the valve is open.

23 Claims, 6 Drawing Sheets

U.S. PATENT DOCUMENTS

| | | | |
|---|---|---|---|
| 3,396,937 | 8/1968 | McDougall | 251/107 |
| 3,903,926 | 9/1975 | Kempler Nee Constantinesco | 137/637 |
| 4,018,292 | 4/1977 | Roll et al. | 251/109 |
| 4,166,579 | 9/1979 | Beise et al. | 239/526 |
| 4,254,667 | 3/1981 | Wong | 251/109 |
| 4,316,600 | 2/1982 | Parise et al. | 251/245 |
| 4,448,391 | 5/1984 | Young | 251/263 |
| 5,042,527 | 8/1991 | Geimer | 251/246 |
| 5,069,421 | 12/1991 | Kishi et al. | 251/99 |
| 5,123,598 | 6/1992 | Courtney et al. | 239/526 |
| 5,213,310 | 5/1993 | Beattie et al. | 251/263 |
| 5,361,804 | 11/1994 | Keller | 251/263 |

OTHER PUBLICATIONS

Instructions–Parts List 307–995 (Rev A) for "In–Line Dispense Valves With and Without Electronic Lubricant Meter", Graco Inc., Minneapolis, MN, 55440–1441, 1989, pp. 1–12.

Badger Meter Repair Parts, Model PG Standard Pistol Grip, IRP–180–06, 53401–180, pp. 6 and 8 (undated).

Oil Meters, Spare Parts for Hose End Meter, Models 24700 and 24704, Orion Alontoc Orion AB, Sweden, 3 pages (undated).

Service Instructions Models 3682–A, 3683–A, 3683–D1 and 321125–1 Hand Held Gear Oil Meters, Alemite Corporation, 4701 Park Road, Charlotte, NC 28209–9967, Sep. 1991, pp. 1–11.

Service Instructions Model 7496 Low Pressure Control Valve, Alemite Corporation, 4701 Park Road, Charlotte, NC 28209–9967, Nov. 1991, pp. 1–3.

FLUID FLOW CONTROL VALVE AND ACTUATING MECHANISM

GOVERNMENT RIGHTS none

CROSS-REFERENCES none

BACKGROUND

The present invention relates generally to a fluid flow control valve, and more particularly concerns a novel arrangement for a fluid control valve and an actuating mechanism for permitting high volume fluid flow, and a hold-open latch and safety for same.

Fluid flow control valves, such as would be used for dispensing oil and other automotive fluids in a vehicle servicing facility, are generally known. Automotive fluids range from those which are light and easy to move, such as air and water, to heavy, high viscosity fluids such as oil, grease and the like. The latter demand high pumping pressure to achieve even moderately adequate flow rates.

A typical fluid flow control valve for such applications comprises a reciprocating push rod for moving a valve seal off of a valve seat. The push rod has a slip fit within a bore in the control valve body to keep the push rod centered and aligned. The push rod is either secured to or engages the valve seal. When the push rod is moved axially, the valve seal is unseated off of the valve seat, permitting fluid flow through the valve. The push rod has a blind hole drilled down the center line and cross holes or broached notches opening into the blind hole to create a fluid flow path to the outlet of the valve body. Unfortunately, this fluid flow path through the push rod is tortuous and restricted. Thus, known valve mechanisms are plagued by low flow rates and high operating pressures which are required to overcome the pressure drop through the valve. Further, the push rod being guided by the valve body to effect linear operative motion frictionally increases actuation force causing wear and preventing smooth action of the actuating mechanism.

In most cases, fluid flow control valve actuating mechanisms have neither a safety nor a latch. Some may have only a latch and some may have only a safety. Occasionally, such actuating mechanisms have both features, but are difficult or inconvenient to operate. Moreover, when a latch is deemed useless or unnecessary, the latch mechanism cannot be disabled.

For the foregoing reasons, there is a need for a fluid flow control valve and actuating mechanism capable of high flow rates and low operating pressures, even for high viscosity, difficult to move fluids. The valve and actuating mechanism should operate smoothly with minimal frictional resistance. The actuating mechanism should also include a latch mechanism for holding the mechanism in the operatively open position. A safety may also be provided to prevent accidental operation of the valve. The operation of each of the latch and safety must be simple and convenient. The latch mechanism should be configured so that it can be disabled when necessary.

SUMMARY

Accordingly, it is an object of the present invention to provide a new valve and actuating mechanism to control the flow of fluids, having one or more of the novel features of this invention as hereinafter shown or described.

Further, it is an object of the present invention to maximize the efficiency of fluid flow through the valve when open.

Another object of the present invention is to allow the user to hold and operate the control valve with one hand, the fingers of the hand on a lever handle which is operable to dispense fluid.

Yet another object of the present invention is to provide a latch and safety mechanism for a fluid flow control valve actuating mechanism for maintaining the valve in the open or closed position having one or more of the novel features of this invention as hereinafter shown or described.

It is an object of this invention that the safety and latch mechanism can be released by a finger of the same hand which depresses the lever handle.

Still further an object of the present invention is to provide a latch to hold the fluid flow control valve open for dispensing large quantities of liquids unattended.

Also an object of the present invention is to provide a means for disabling the latch feature when unnecessary to avoid the risk of overfilling which might occur if the lever handle is not unlatched in time.

Still another object of the present invention is to provide a valve locking mechanism which automatically locks the valve closed upon release of the handle to prevent accidental fluid discharge.

A related object of the present invention is to provide a safety and a latch that are readily accessible to the operator. It is thus an object of the present invention to provide an improved fluid control valve assembly and actuating means wherein operation can be accomplished with one hand including opening or closing the valve and locking of the valve in the open or closed position, as well as the unlocking of the valve from either of these positions.

Finally, an object of the present invention is to minimize the manufacturing costs associated with valve construction, the cost benefits realized due to fewer machining operations to manufacture a suitable push rod for use in the valve.

The present invention is directed to a fluid flow control valve for controlling fluid flow through a passage in a housing, the valve comprising a valve seat having an inlet side and an outlet side, the valve seat adapted to be positioned inside the housing for defining an opening in the passage which is smaller than the passage; a valve seal which is larger than the valve seat opening, the valve seal positioned against the inlet side of the valve seat for closing off fluid communication between the inlet side and the outlet side of the valve seat and a push rod extending from the valve seal and through the opening defined by the valve seat, the push rod moveable with respect to the valve seat for moving the valve seal off the seat to open the valve. The present invention further comprises means for restricting movement of the valve seal to axial movement relative to the valve seat. For example, a spring biasing the valve seal against the valve seat may be sized so as to engage the walls of the passage for restricting the valve to axial movement relative to the passage.

Actuating means for the valve of the present invention comprises a shaft having a cam surface, the cam shaft rotatably mounted in the housing, and means for rotating the cam shaft, such as a handle non-rotatably connected to the shaft. The handle is movable between a first position at an angle relative to the housing wherein the valve is in the closed position to a second position adjacent the housing wherein the valve is in an open position.

Further in accordance with the present invention, valve-open maintaining means are provided comprising a latch arm pivotally mounted on the handle and a pin secured to the housing for receiving the latch. A manipulator operatively accessible through an opening in the handle operates to engage the pin with the latch arm thereby releasably locking the handle in the second position. A safety may also be included comprising a blocking element pivotally connected to the latch. An end of the blocking element butts against a portion of the housing in a blocking position when the handle is in the first position so as to prevent the handle from being moved to the second position. The manipulator operates to move the blocking element to a non-blocking position upon depression of the manipulator.

A particular feature of the present invention for maximizing fluid flow is the use of a valve configuration which allows the fluid to flow around the outside rather than through the inside of the valve assembly. Moreover, a substantial portion of the cam shaft is positioned out of the valve passage to maximize fluid flow around the shaft when the valve is open. A further feature of the valve is the provision of a single manipulator which is used to release the safety and engage the latch. Another feature of the present invention is a removable pin for disabling the latch mechanism.

Thus, it is seen that there is provided an actuating mechanism comprising a fluid flow control valve and actuating mechanism capable of high flow rates and low operating pressures, even for high viscosity, difficult-to-move fluids. The actuating mechanism operates smoothly because the valve seal is restricted to axial movement. A latch mechanism is also provided for holding the mechanism in the operatively open position and a safety for preventing accidental operation. The latch and safety mechanism may be conveniently operated by the same hand of the user.

BRIEF DESCRIPTION OF THE DRAWINGS

For a more complete understanding of this invention, reference should now be had to the embodiments illustrated in greater detail in the accompanying drawings and described below. In the drawings, like reference numbers refer to the same or similar parts throughout the several views, wherein.

DESCRIPTION

Figures 1, 4, 5:
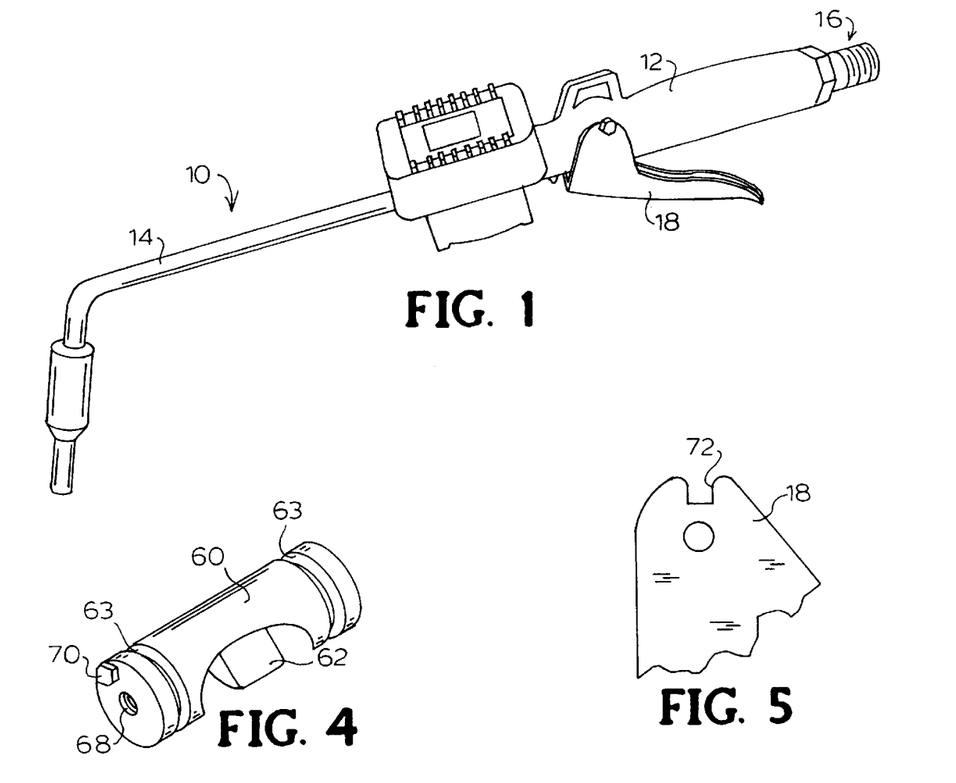
FIG. 1 is a side elevational view of a fluid flow control device embodying features of the present invention.
FIG. 4 is a view of an embodiment of a cam shaft suitable for use in the present invention.
FIG. 5 is a portion of a handle side.

FIG. 1 shows a fluid flow control device embodying features of the present invention, generally designated at 10. The fluid flow control device comprises a body portion 12, a nozzle 14 and a fluid supply connection 16. The body 12 comprises materials typically used for fluid flow control devices, including metal, plastic and the like. The fluid supply (not shown) may, for example, be a pressurized source of fluid. A trigger for operating the fluid flow control device 10 is provided, such as a rotating lever handle 18 shown in FIG. 1. The device 10 is preferably sized to fit comfortably into the user's hand for controlled operation of the lever handle 18 by the fingers of the same hand.

Figure 2:
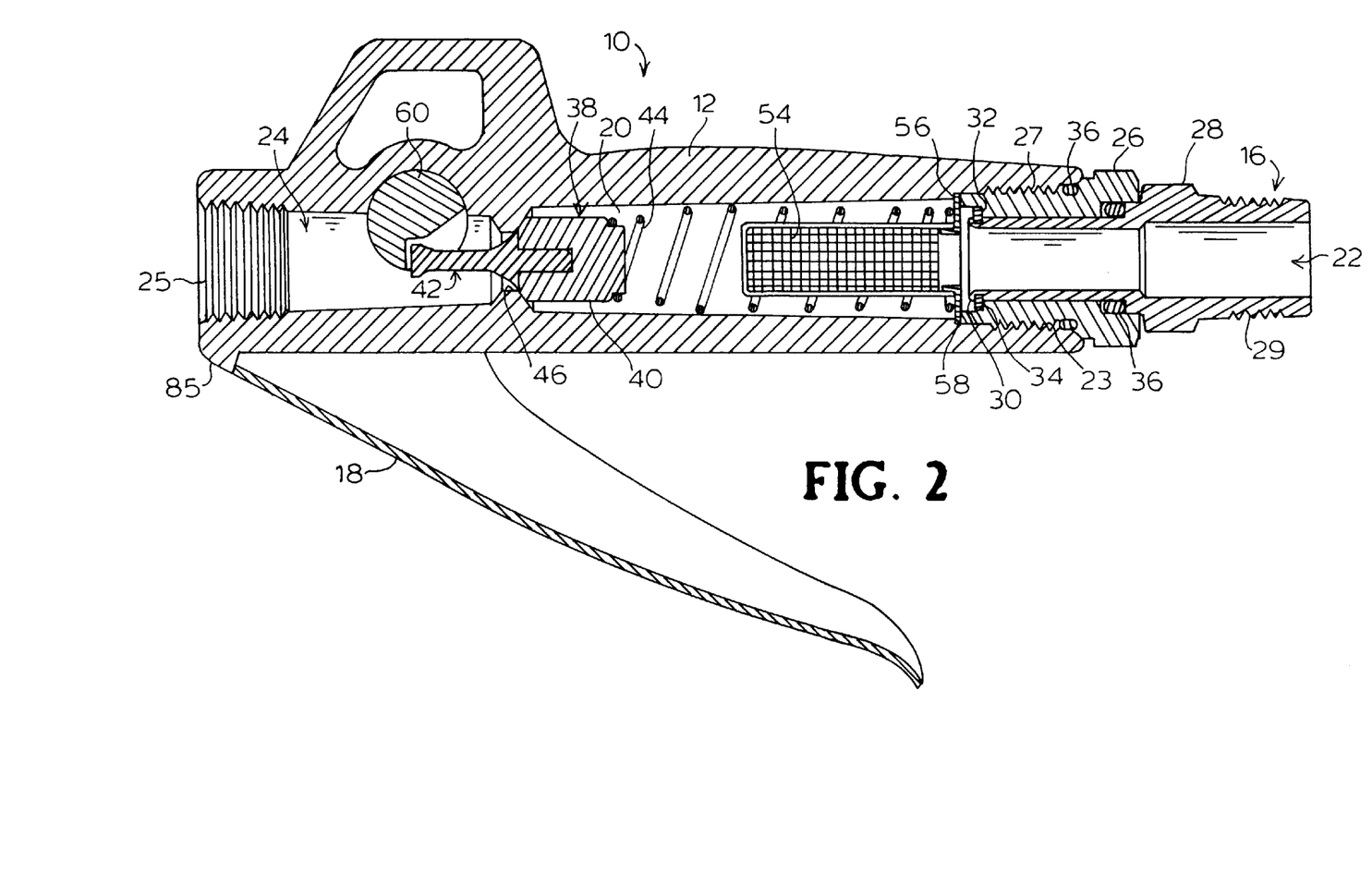
FIG. 2 is sectional view of the body and handle of the fluid flow control device shown in FIG. 1.

Referring to FIG. 2, a passage 20 extends axially through the body 12. One end of the passage 20 constitutes an inlet 22 for receiving fluid from the fluid supply source (not shown). The inlet end 22 of the body 12 is internally threaded 23 for coupling to the fluid supply connection 16. The opposite end of the passage 20 is an outlet 24 for the fluid. The outlet end 24 also has an internal thread 25 for a standard pipe thread connection to the nozzle 14, or other suitable fluid delivery element.

The fluid supply connection 16 is a conventional swivel assembly comprising a fixed swivel body 26 and a swivel stem 28 rotatably mounted in and attached to the swivel body 26. The swivel body 26 is externally threaded for engaging the internally threaded portion 23 of the inlet end 22 of the body 12. The swivel stem 28 is slidably received in the swivel body 26. The inner end of the swivel stem 28 is curled outwardly forming a retaining lip 30 which seats against a washer 32 disposed against an annular shoulder 34 in the swivel body 26. The outer end of the swivel stem 28 has an external thread 29 for coupling to a fitting (not shown), such as a pipe, a hose or the like, for establishing fluid communication with the fluid supply source. O-rings 36 around the swivel body 26 and swivel stem 28 prevent leakage. Preferably, the swivel assembly is designed to pass SAE #10 oil at pressures ranging from 50 to 1500 psi without leaking and require no more than about 25 in/lb of torque at 1500 psi to initiate swiveling action. Also, the preferred swivel body 26 and swivel stem 28 should not separate and the retaining lip 30 should remain curled at pressures up to about 3000 psi.

Figure 3:
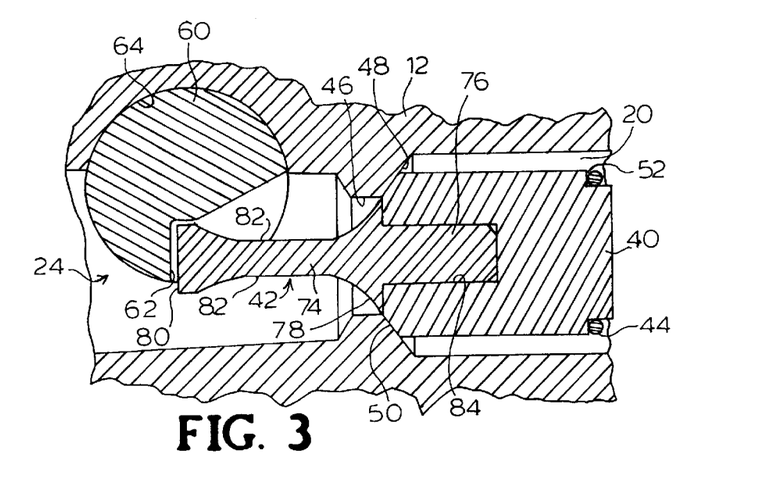
FIG. 3 is a sectional view showing an embodiment of the fluid flow control valve in closed position.

Fluid flow through the passage 20 is controlled by a fluid flow control valve 38 positioned intermediate the inlet 22 and outlet 24 ends. Referring to FIG. 3, the passage 20 within the body 12 adjacent the valve seal 40 is provided with an annular shoulder 46. The inlet or pressure side of the shoulder 46 constitutes a substantially conical, annular valve seat 48 against which a valve seal 40 is adapted to seat for shutting off fluid communication between the inlet 22 and outlet 24 of the body 12. Preferably, the valve seal 40 is a resilient, durable material, such as rubber, and has a sloped or slanted peripheral outer edge 50 to conform to the conically-shaped valve seat 48, providing a self-centering, sealing engagement.

A pushrod 42 is a substantially cylindrical member having an outlet end 74, an inlet end 76 and a shoulder 78 defining the boundary between the outlet end 74 of the push rod and the inlet end 76. The outlet end 74 of the push rod 42 thus extends from adjacent the valve seat 48 and through the shoulder 46 towards the outlet 24 end of the body 12. The outlet end 74 of the push rod 42 has a flat head 80 and parabolically recessed sides 82 indicative of a substantially hourglass shape and is sized to permit free reciprocation within the passage 20. The inlet end 76 of the push rod 42 is received in an axial bore 84 in the valve seal 40.

Referring again to FIG. 2, a helical compression spring 44 is positioned under initial compression between the swivel body 26 at the inlet 22 of the passage 20 and a spring-supporting shoulder 52 on the valve seal 40. The spring 44, along with fluid pressure from the fluid supply source, urge the valve 38 to the closed position by forcing the seal 40 against the shoulder 46. A mesh screen strainer 54 is positioned inside the spring 44. The inlet end of the strainer 54 has a flange 56 which is held against the end of the swivel body 26 by the force of the spring 44 on the flange 56. The strainer flange 56 fits against a shoulder 58 in the body 12 which holds the strainer 54 in place even if it becomes clogged, thereby preventing contaminates from bypassing the strainer 56.

At least a portion of the spring 44 is sized to fit closely within the walls of the passage 20 of the body 12. This close fit promotes a coaxial relationship between the spring 44 and the passage 20 which in turn allows the spring 44 to keep the valve seal 40 in general axial alignment with the valve seat 48. Alternatively, radially extending axial fins can be molded on the periphery of the valve seal 40 or on the push rod 42, or cast ribs can extend radially inwardly from the walls of the passage 20 adjacent the seal 40, which would serve to guide the push rod 42 and valve seal 40 to ensure axial movement of the valve seal 40. One disadvantage of fins is they would be difficult to manufacture. A further disadvantage is that fins reduce fluid flow area through the passage 20 and induce turbulence.

Figure 6:
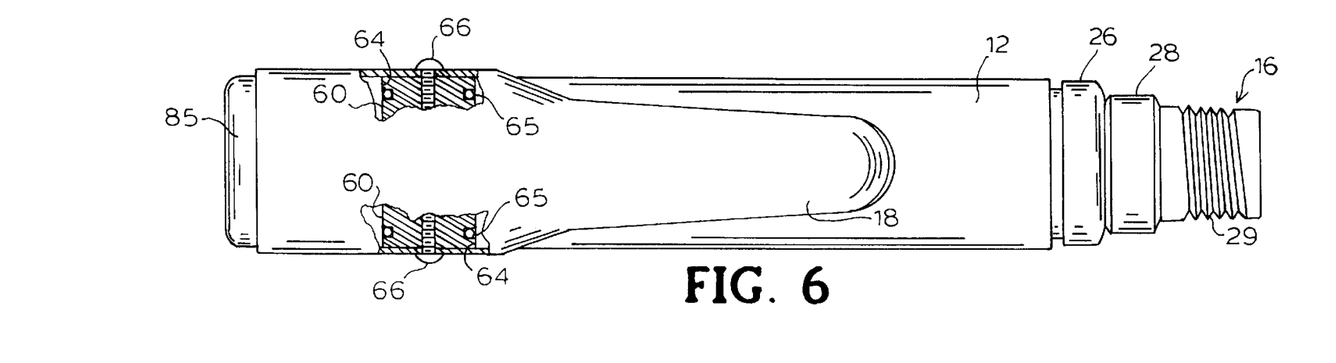
FIG. 6 is a bottom plan view, partially shown in cross-section, of the fluid flow control device shown in FIG. 1.

Means for actuating the valve 38 comprises a substantially cylindrical cam shaft 60 (FIG. 4). The central portion of the cam shaft 60 is cut away so as to form a flat cam surface 62. A groove 63 at each end of the cam shaft 60 receives an O-ring 65. As seen in FIG. 6, a transverse cross hole 64 in the body 12 opens into the passage 20 downstream of the shoulder 46 (not shown in FIG. 6) and accommodates the cam shaft 60. The O-rings 65 seal the ends of the cam shaft 60 within the cross hole 64 in the body 12 to prevent leakage. As seen in FIG. 3, the flat cam surface 62 is adjacent and parallel to the head 80 of the push rod 42. The axis of rotation of the cam shaft 60 is substantially perpendicular to the direction of movement of the push rod 42 and valve seal 40. When the cam shaft 60 is in a position for permitting the valve 38 to be closed, there is a slight amount of clearance between the head 80 of the push rod 42 and the cam surface 62, thereby ensuring that the valve 38 will not be held open by engagement of the push rod 42 with the cam surface 62.

The lever handle 18 (FIG. 1) is an elongated member of generally U-shaped transverse cross section. The upwardly extending sides of the handle 18 enclose the body 12 and are connected to the ends of the cam shaft 60 using suitable fasteners 66, such as screws in holes 68 (FIG. 4) in the ends of the shaft 60. As seen in FIG.'s 4 and 5, notches 72 in the edge of the handle 18 sides engage a tab 70 at each end of the cam shaft 60 rotating the cam shaft 60 with movement of the handle 18. The handle 18 is operated by gripping and compressing the handle 18 toward the body 12. The handle 18 is fitted to the body 12 such that it may be readily operated by the fingers of the user's hand holding the body 12.

Figure 7:
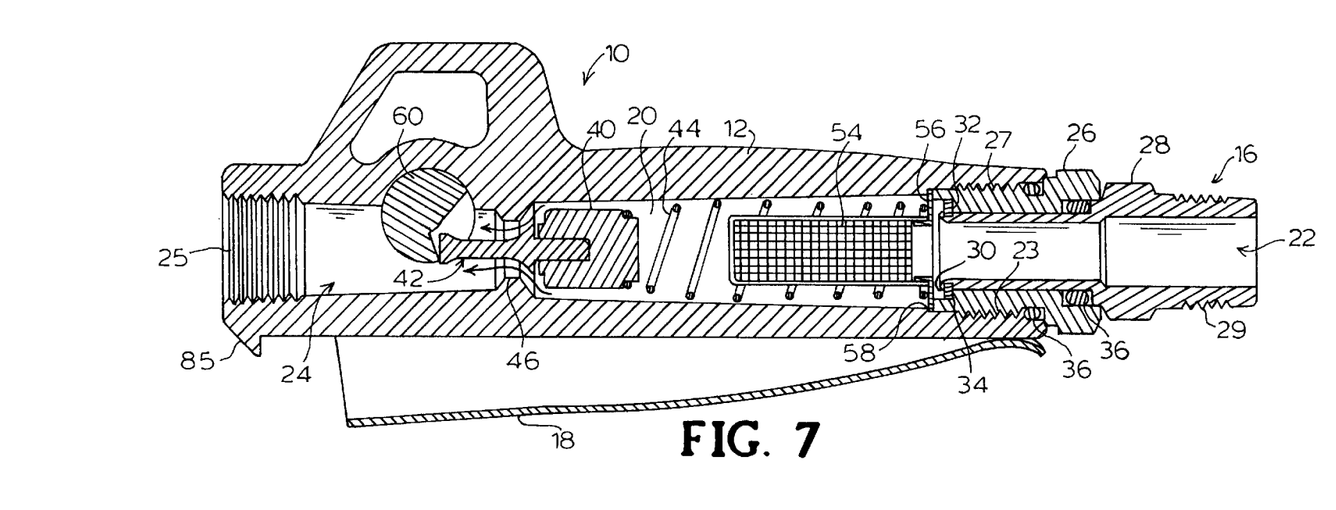
FIG. 7 is a sectional view corresponding to FIG. 2 after the lever handle has been depressed and with fluid flow control valve in the open position.
Figure 8:
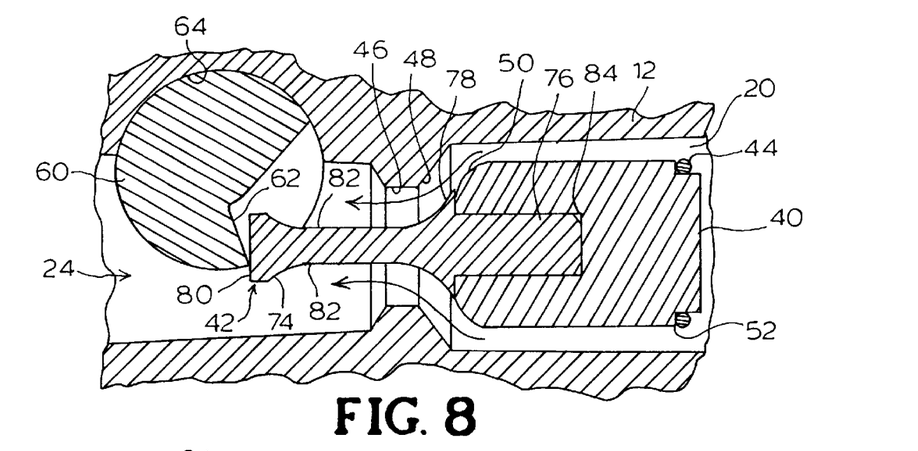
FIG. 8 is a sectional view of the valve shown in FIG. 3 showing the valve in the open position.

The lever handle 18 extends at an incline to the body 12 when the valve 38 is in the closed position (FIG. 2). For fluid delivery, the user manually depresses the lever handle 18 inwardly relative to the body 12 as shown in FIG. 7. Depression of the handle 18 towards the body 12 produces a counterclockwise rotation of the cam shaft 60. As best seen in FIG. 8, rotation of the cam shaft 60 moves the cam surface 62 against the head 80 of the push rod 42, causing axial rightward movement of the push rod 42 in the passage 20 towards the inlet 22. Rightward movement of the pushrod 42 carries the valve seal 40 away from the valve seat 48 against the force of the spring 44 and fluid pressure. This movement opens the valve 38, allowing fluid to flow through the passage 20. As indicated by the arrows in FIG. 8, fluid flows around the seal 40 and between the recessed sides 82 of the push rod 42 and the inner walls of the shoulder 46 and passage 20, past the cam shaft 60 and through the outlet 24 to the nozzle 14. The fluid flow path comprises a relatively large area, due in part to the parabolic shape of the push rod 42, which shape also minimizes flow turbulence. Since fluid flow is around and not through the push rod 42, there is very little obstruction to flow. Further, the controlled axial movement of the valve seal 40 and push rod 42 provided by the spring 44 arrangement permits positioning of the cam shaft 60 partially out of the passage 20, thereby increasing fluid flow area. Thus, fluid flow rates are maximized and the operating pressure required to move fluid is minimized.

Rightward movement of the valve seal 40 and push rod 42 compresses the spring 44. When the user releases the handle 18, the spring 44 and the fluid pressure on the inlet side of the valve seal 40 urge the valve 38 to the closed position, wherein the valve seal 40 contacts the seat 48 stopping fluid flow. Simultaneously, the head 80 of the push rod 42 acts against the cam surface 62 of the cam shaft 60, rotating the handle 18 away from the body 12 and back to its inclined position. Further clockwise rotation of the handle 18 is prevented by a raised portion 85 on the body (FIG. 2).

Figure 9:
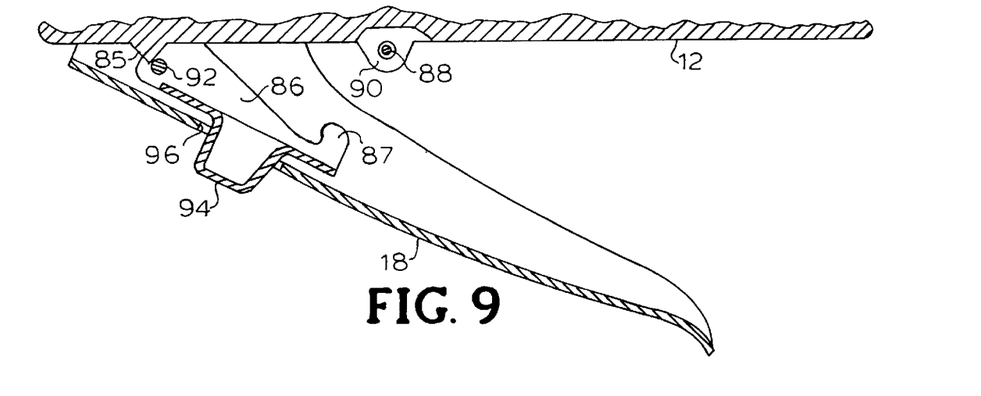
FIG. 9 is a sectional view of an embodiment of the fluid flow control device of the present invention including a latching feature.
Figure 10:
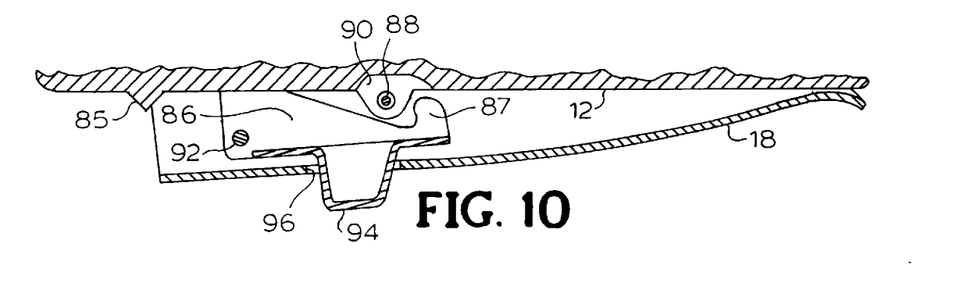
FIG. 10 is a sectional view corresponding to FIG. 9 after the lever handle has been depressed.
Figure 11:
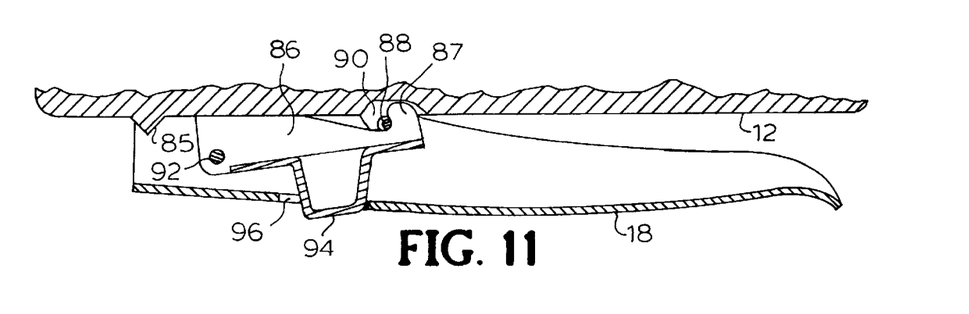
FIG. 11 is a sectional view corresponding to FIG. 10 showing the latch engaged.

In accordance with a further aspect of the present invention, FIGS. 9–11 show a further embodiment of the present invention wherein means is provided for holding the valve 38 in the open position. The hold-open means comprises a hook-shaped latch arm 86 and a roll pin 88 borne by a raised ear 90 integral with the body 12. The latch arm 86 has a catch 87 and a transverse hole at the end opposite the catch 87 where it is pivotally mounted to the handle 18 by a pin 92. Integral with the latch arm 86 is a push button 94 which projects through an opening 96 in the handle 18. The push button 94 is arranged in a suitable position for manipulation by a finger of the user.

As seen in FIG. 10, when the handle 18 is depressed inwardly against the body 12 opening the valve 38, the latch 86 is carried to a position where the catch 87 is adjacent the roll pin 88. By depressing the button 94 (FIG. 11), the catch 87 hooks over the roll pin 88. When the handle 18 is released, the handle 18 begins to return to the inclined position under force of the spring 44 and fluid flow, as described above. However, because the latch is carried with the handle when released, the latch 86 translates leftwardly resulting in the hook 87 engaging the roll pin 88, thereby holding the handle 18 in the depressed position. The lever handle 18 is thus secured in a latched position and the valve 38 remains open. The lever handle 18 is released from the latched position by manual depression of the handle 18 which moves the latch 86 rightwardly of the roll pin 88. If the button 94 is not depressed when the handle 18 is subsequently released, the catch 87 will move past the roll pin 88 without engaging the pin. The handle 18 is now free to rotate away from the body 12 and the valve 38 returns to the closed position. Note that in this embodiment the raised portion 85 of the body is positioned to contact the pin 92 for preventing further clockwise rotation of the handle 18. If desired, the latch feature is easily disabled by removing the roll pin 88.

Figures 12, 12A:
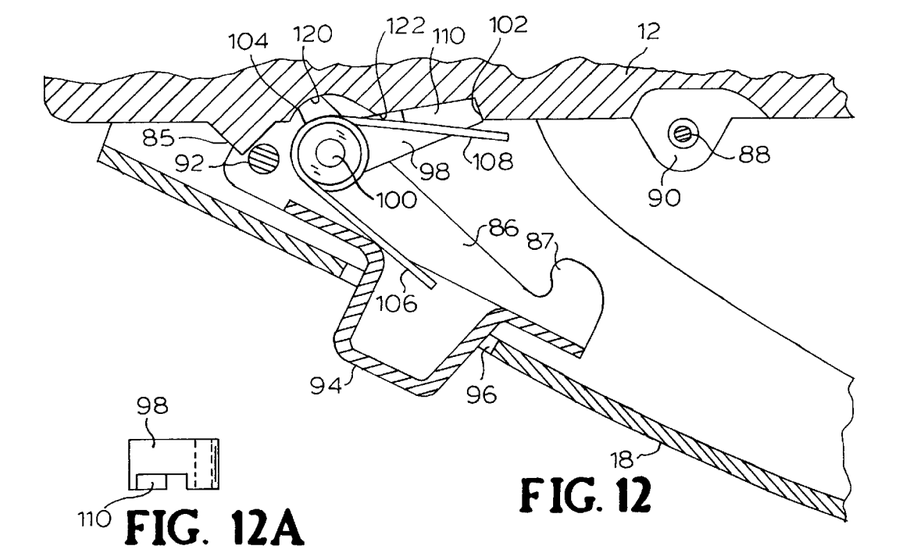
FIG. 12 is a sectional view of an embodiment of the fluid flow control device of the present invention including a safety feature.
FIG. 12A is a top plan view showing an embodiment of a safety lever for use with the present invention.

Referring now to FIG. 12, and further in accordance with the present invention, provision is made for locking the handle 18 from movement when the valve 38 is in the closed position. The handle 18 locking means includes a safety lever 98, rotatably mounted on a pin 100 in the latch arm 86, and a stop 102 formed in the body 12 for receiving the free end of the safety lever 98. A torsion spring 104 surrounds the pin 100. One arm 106 of the spring bears against the underside of the latch arm 86. The other arm 108 of the spring seats against a lip 110 extending from the side of the safety lever 98 (FIG. 12A). The spring 104 acts to bias the safety lever 98 against the body 12 and to pivot the latch arm 86 outwardly from the body 12, thus biasing the push button 94 out through the opening 96 in the handle 18. When the valve 38 is in the closed position and the handle 18 inclined from the body 12 (FIG. 12), the safety lever 98 abuts the stop 102 in the body 12 thereby preventing inward movement of the handle 18. If an attempt is made to depress the lever handle 18, the lever handle will be braced against the safety lever 98 which in turn is braced against the body 12. Accordingly, the lever handle 18 cannot be accidentally moved inwardly to open the valve 38. Thus, the safety lever 98 provides a means for controlling the operation of the fluid flow control valve 38, whereby it is impossible to operate the handle 18 without pressing the button 94 to release the safety lever 98 from the stop 102.

Figure 13:
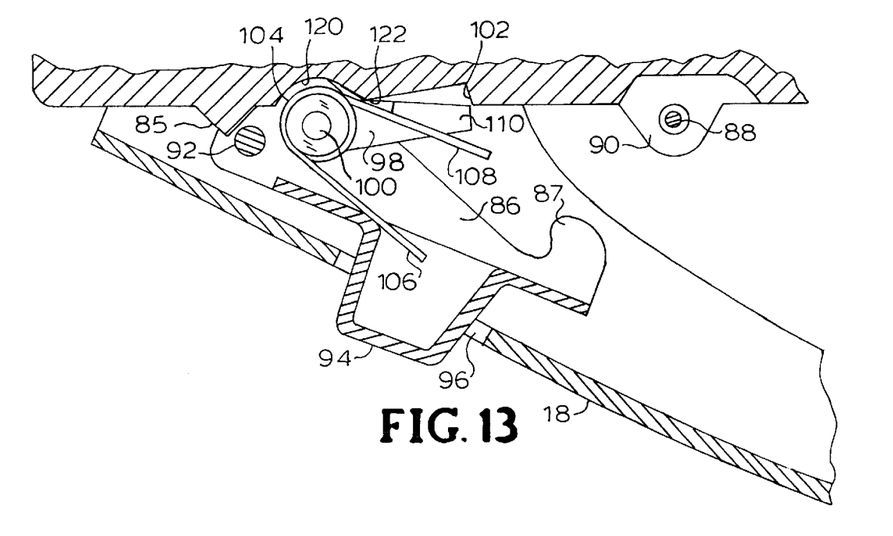
FIG. 13 is a sectional view corresponding to FIG. 12 after the safety has been disengaged.

As shown in FIG. 13, pressing the button 94 causes the latch 86 to rotate toward the body 12 which carries the pinned end of the safety lever 98 into a depression 120 in the body. This causes the safety lever 98 to rock on a fulcrum point 122 on the body 12 between the depression 120 and stop 102, pivoting the safety lever 98 clockwise and moving the of the end safety lever 98 out of engagement with the stop 102. The lever handle 18 can now be depressed inwardly toward the body 12 opening the valve 38, as described above.

Figure 14:
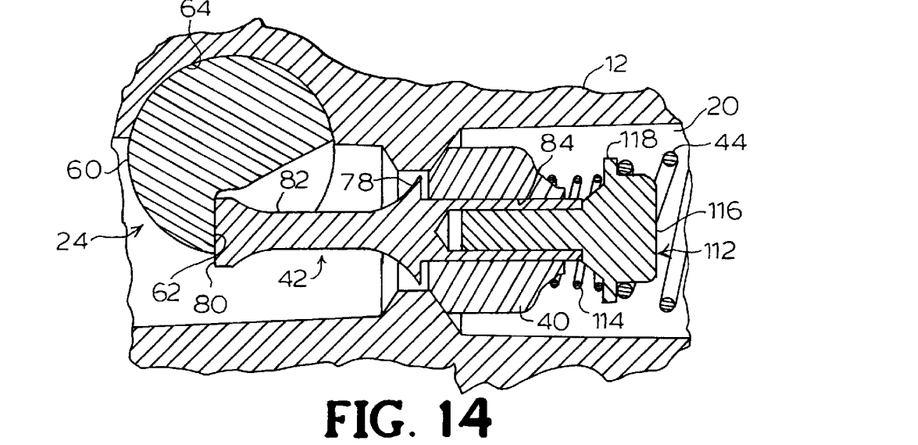
FIG. 14 is a sectional view showing another embodiment of the fluid flow control valve of the present invention in the closed position.

Referring now to FIG. 14, there is shown another embodiment of the fluid flow control valve 38 of the present invention for use in concert with the locking means. The fluid flow control valve shown includes all of the features of the valve 38 described above and further comprises a spring support 112 and a small spring 114. The spring support 112 is a substantially round element and includes an enlarged head portion 116 having a peripheral flange 118. The flange 118 serves as an abutment surface for the outlet end of the compression spring 44. The axial bore 84 receiving the inlet end of the push rod 42 passes completely through the valve seal 40 and is sized so that the seal 40 and push rod 42 move independently of one another. The inlet end of the push rod 42 is further provided with an axial bore for receiving the leftmost end of the spring support 112. The small spring 114 is held in compression between the spring support flange 118 and the valve seal 40. The inlet end of the valve seal 40 forms a lip for sealing against the push rod 42.

Figure 15:
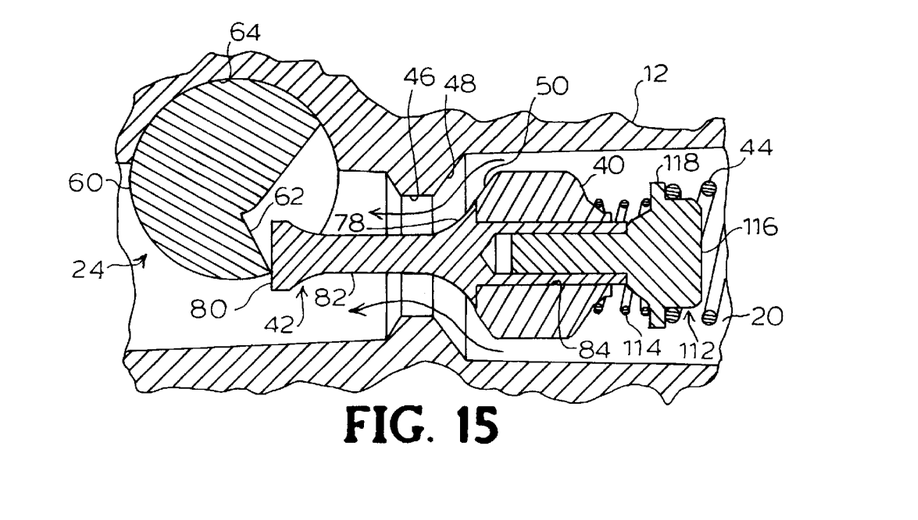
FIG. 15 is a sectional view of the valve shown in FIG. 14 showing the valve in the open position.

As shown in FIG. 15, rightward movement of the push rod 42 by the cam surface 62 of the rotating cam shaft 60 slides the pushrod 42 into the valve seal hole 84 until the shoulder 78 engages the valve seal 40. Continued rightward movement of the pushrod 42 moves the valve seal 40 away from the valve seat 48, opening the valve 38. When the handle is released, the small spring 114 cooperates with the spring 44 and fluid pressure to force the pushrod 42 against the cam surface 62 rotating the shaft 60 and handle 18 to the inclined position relative to the body 12. The small spring 114 ensures that the seal 40 seats in the closed position of the valve 38. Also, there is no gap between the cam shaft 60 and the head 80 of the push rod 42. Thus, it is apparent that the spring 44 provides the necessary biasing force to cause the pushrod 42 to rotate the cam shaft 60 until the latch arm pin 92 contacts the raised portion 85 on the body to ensure the safety lever 98 engages the stop 102 on the body 12 (FIG. 12). This action is possible since the push rod 42 is free to move independently of the valve seal 40. It is understood that, although not shown, other means for returning the safety lever 98 to the engaged position may be used, including external biasing means such as spring or the like forcing the handle 18 to the position at which the valve 38 is closed.

The embodiments of the present invention have many advantages, including higher flow capability and corresponding reduced operating pressures due to the larger flow area and smoother flow path flow due to the shape of the pushrod and positioning of the cam shaft partially out of the flow path. The spring arrangement reliably aligns the valve seal with the valve seat and results in an actuating mechanism which operates reliably and smoothly. Moreover, the mechanism for holding the valve in the operatively open position allows fluid flow to continue unattended when desired, and is easily disabled when necessary. The safety feature provides a means for controlling the operation of the handle whereby it is impossible to operate the valve without releasing the safety. Accidental or unintentional operation is prevented. The latch and safety features are available individually or in combination. The result is a valve mechanism capable of efficiently moving high viscosity, difficult to move fluids, which is simple and convenient to operate, while at the same time cost effective to manufacture.

While the present invention has been described in considerable detail in connection with several embodiments thereof, other versions are possible. It will be understood, of course, that I do not intend to limit the invention to these embodiments since modifications may be made by those skilled in the art, particularly in light of the foregoing teachings. For example, any resilient means for returning the handle and valve to the closed position may be used. On the contrary, I intend to cover all alternatives, modifications and equivalents as may be included within the spirit and scope of the invention as defined by the appended claims. It is, therefore, contemplated by the appended claims to cover any such modifications as incorporate those features which constitute the essential features of these improvements within the true spirit and the scope of the invention. Therefore the spirit and scope of the appended claims should not be limited to the description of the embodiments contained herein.

I claim:

1. A valve for controlling fluid flow through a housing having a passage, the fluid flow control valve comprising:
   a valve seat having an inlet side and an outlet side, the valve seat adapted to be positioned inside the housing for defining an opening in the passage which is smaller than the passage;

a valve seal which is larger than the valve seat opening, the valve seal positioned against the inlet side of the valve seat in a closed position of the valve for closing off fluid communication between the inlet side and the outlet side of the valve seat;

a solid push rod having an inlet end, an outlet end and a shoulder between the ends, the inlet end of the push rod slidably received in an opening in the valve seal so that the push rod moves independently of the valve seal and the outlet end of the push rod extending from the valve seal through the opening defined by the valve seat, the push rod substantially reduced in size intermediate the shoulder and the outlet end to permit maximum fluid flow around the push rod and through the passage;

biasing means adapted to be disposed in the housing to operatively engage a portion of the push rod and seal, the biasing means providing counteracting forces in the closed position of the valve so that the shoulder on the push rod is moved to a position spaced from the valve seal when the valve is in the closed position, the shoulder engaging the valve seal when the push rod is moved in a direction toward the inlet side of the valve seat against the force of the biasing means for moving the valve seal off the seat to open the valve; and means for restricting movement of the valve seal to substantially axial movement relative to the valve seat.

2. A fluid flow control valve as recited in claim 1, further comprising means for biasing the valve seal against the inlet side of the valve seat.

3. A fluid flow control valve as recited in claim 2, wherein the push rod further comprises a spring support on the inlet end of the push rod, the spring support having an inlet surface and outlet surface, and the valve seal biasing means comprises a first spring adapted to be disposed in the passage on the inlet side of the valve seat for engaging the inlet surface of the spring support and a second spring positioned between the outlet surface of the spring support and the valve seal, wherein the first spring biases the push rod to the position where the shoulder is spaced from the valve seal in the closed position of the valve.

4. A fluid flow control valve as recited in claim 1, wherein the valve movement restricting means comprises a spring for biasing the valve seal against the inlet side of the valve seat, the spring adapted to be disposed in the passage on the inlet side of the valve seat and to engage the walls of the housing defining the passage.

5. An apparatus for controlling fluid flow, the fluid flow control apparatus comprising:

a housing having a through passage;

a valve disposed within the housing, the valve comprising
a valve seat having an inlet side and an outlet side, the valve seat positioned in the passage,
a valve seal,
a solid push rod having an inlet end, an outlet end and a shoulder between the ends, the inlet end of the push rod slidably received in an opening in the valve seal so that the push rod moves independently of the valve seal and the outlet end of the push rod extending from the valve seal through the opening defined by the valve seat, the push rod substantially reduced in size intermediate the shoulder and the outlet end to permit maximum fluid flow around the push rod and through the passage, and
spring means disposed in the housing, the spring means operatively engaging a portion of the push rod and seal for biasing the valve to a closed position wherein the valve sea is against the inlet side of the valve seat and for providing counteracting forces in the closed position of the valve so that the shoulder on the push rod is moved to a position spaced from the valve seal when the valve is in the closed position, the shoulder engaging the valve seal when the push rod is moved in a direction toward the inlet side of the valve seat against the biasing force of the spring means for moving the valve seal off the seat to open the valve, the spring means engaging the passage walls for restricting the valve seal to axial movement relative to the passage; and means for actuating the valve.

6. A fluid flow control apparatus as recited in claim 5, wherein the push rod further comprises a spring support on the inlet end of the push rod, the spring support having an inlet surface and outlet surface, and the spring is disposed in the passage on the inlet side of the valve seat for engaging the inlet surface of the spring support, and further comprising a second spring positioned between the outlet surface of the spring support and the valve seal also for biasing the valve seal against the inlet side of the valve seat, wherein the first spring biases the push rod to the position where the shoulder is spaced from the valve seal in the closed position of the valve.

7. A fluid flow control apparatus as recited in claim 5, wherein the actuating means comprises a shaft having a cam surface, the shaft rotatably mounted in the body with a substantial portion of the shaft positioned out of the passage to maximize fluid flow around the shaft when the valve is open, and means for rotating the cam shaft.

8. A fluid flow control apparatus as recited in claim 5, wherein the shaft rotating means comprises a handle external to the body, the handle non-rotatably connected to the shaft and movable between a first position at an angle relative to the body wherein the valve is in the closed position to a second position adjacent the housing wherein the valve is in an open position.

9. A fluid flow control apparatus as recited in claim 8, further comprising means for maintaining the valve in the open position.

10. A fluid flow control apparatus as recited in claim 7, wherein the spring biases the outlet end of the push rod into engagement with the cam surface.

11. An apparatus for controlling fluid flow, the fluid flow control apparatus comprising:

a housing having a through passage;

a valve disposed within the housing, the valve comprising
a valve seat having an inlet side and an outlet side, the valve seat positioned in the passage,
a valve seal,
a solid push rod having an inlet end, an outlet end and a shoulder between the ends, the inlet end of the push rod slidably received in an opening in the valve seal so that the push rod moves independently of the valve seal and the outlet end of the push rod extending from the valve seal, the push rod substantially reduced in size intermediate the shoulder and the outlet end to permit maximum fluid flow around the push rod and through the passage, and
spring means disposed in the housing, the spring means operatively engaging a portion of the push rod and seal for biasing the valve to a closed position wherein the valve seal is against the inlet side of the valve seat and for providing counteracting forces in the closed position of the valve so that the shoulder on the push rod is moved to a position spaced from the valve seat when the valve is in the closed position, the shoulder engaging the valve seal when the push rod is moved in a direction toward the inlet side of the valve seat against the biasing force of the spring means for moving the valve seal off the seat to open the valve, the spring means engaging the passage walls for restricting the valve seal to axial movement relative to the passage;

means for actuating the valve, the valve actuating means comprising
    a shaft having a cam surface, the shaft rotatably mounted in the body, wherein a substantial portion of the shaft is positioned out of the passage to maximize fluid flow around the shaft when the valve is open, and
    means for rotating the cam shaft, the shaft rotating means comprising a handle external to the body, the handle non-rotatably connected to the shaft and movable between a first position at an angle relative to the body wherein the valve is in the closed position to a second position adjacent the housing wherein the valve is in an open position; and means for maintaining the valve in the open position, the valve-open maintaining means comprising
    a latch arm pivotally mounted on the handle, and
    a pin secured to the housing for receiving the latch arm and releasably locking the handle in the second position.

12. A fluid flow control apparatus as recited in claim 11, wherein the latch arm further comprises a manipulator operatively accessible through an opening in the handle for pivoting the latch into engagement with the roll pin when the handle is in the second position.

13. A fluid flow control apparatus as recited in claim 11, further comprising a safety, the safety comprising:
    a blocking element pivotally connected to the latch arm, an end of the blocking element adapted to butt against a portion of the housing in a blocking position where the lever handle is in the first position so as to prevent the handle from being moved to the second position.

14. A fluid flow control apparatus as recited in claim 13, wherein the latch arm further comprises a manipulator operatively accessible through an opening in the handle for moving the blocking element to a non-blocking position upon depression of the manipulator.

15. A fluid flow control apparatus as recited in claim 11, wherein the spring biases the outlet end of the push rod into engagement with the cam surface for biasing the handle to the first position.

16. A fluid flow control apparatus as recited in claim 11, wherein the push rod further comprises a spring support on the inlet end of the push rod, the spring support having an inlet surface and outlet surface, and the spring is disposed in the passage on the inlet side of the valve seat for engaging the inlet surface of the spring support, and further comprising a second spring positioned between the outlet surface of the spring support and the valve seal also for biasing the valve seal against the inlet side of the valve seat, wherein the first spring biases the push rod to the position where the shoulder is spaced from the valve seal in the closed position of the valve.

17. A fluid flow control apparatus as recited in claim 11, wherein the spring biases the outlet end of the push rod into engagement with the cam surface for biasing the handle to the first position.

18. A fluid flow control apparatus as recited in claim 11, wherein the push rod further comprises a spring support on the inlet end of the push rod, the spring support having an inlet surface and outlet surface, and the spring is disposed in the passage on the inlet side of the valve seat for engaging the inlet surface of the spring support, and further comprising a second spring positioned between the outlet surface of the spring support and the valve seal also for biasing the valve seal against the inlet side of the valve seat, wherein the first spring biases the push rod to the position where the shoulder is spaced from the valve seal in the closed position of the valve.

19. An apparatus for controlling fluid flow, the fluid flow control apparatus comprising:
    a housing having a through passage;
    a valve disposed within the housing, the valve comprising
        a valve seat having an inlet side and an outlet side, the valve seat positioned in the passage,
        a valve seal,
        a solid push rod having an inlet end, an outlet end and a shoulder between the ends, the inlet end of the push rod slidably received in an opening in the valve seal so that the push rod moves independently of he valve seal and the outlet end of the push rod extending from the valve seal, the push rod substantially reduced in size intermediate the shoulder and the outlet end to permit maximum fluid flow around the push rod and through the passage, and
        spring means disposed in the housing, the spring means operatively engaging a portion of the push rod and seal for biasing the valve to a closed position wherein the valve seal is against the inlet side of the valve seat and for providing counteracting forces in the closed position of the valve so that the shoulder on the push rod is moved to a position spaced from the valve seal when the valve is in the closed position, the shoulder engaging the valve seal when the push rod is moved in a direction toward the inlet side of the valve seat against the biasing force of the spring means for moving the valve seal off the seat to open the valve, the spring means engaging the passage walls for restricting the valve seal to axial movement relative to the passage;

means for actuating the valve, the valve actuating means comprising
    a shaft having a cam surface, the shaft rotatably mounted in the body, and
    means for rotating the cam shaft, the shaft rotating means comprising a handle external to the body, the handle non-rotatably connected to the shaft and movable between a first position at an angle relative to the body wherein the valve is in the closed position to a second position adjacent the housing wherein the valve is in an open position;

means for maintaining the valve in the closed position.

20. A fluid flow control apparatus as recited in claim 19, the valve-closed maintaining means comprising
    a lever arm pivotally mounted on the handle, and
    a blocking element pivotally connected to the lever arm, an end of the blocking element adapted to butt against a portion of the housing in a blocking position where the lever handle is in the first position so as to prevent the handle from being moved to the second position.

21. A fluid flow control apparatus as recited in claim 20, wherein the lever arm is operatively accessible through an opening in the handle for moving the blocking element to a non-blocking position upon depression of the manipulator.

22. An apparatus for controlling fluid flow, the fluid flow control apparatus comprising:
- a housing having a through passage for passing fluid, the housing having an inlet end and an outlet end;
- a valve disposed inside the housing, the valve comprising
  - a valve seat for defining a valve seat opening in the passage, the opening being smaller than the passage,
  - a valve seal, which is larger than the valve seat opening, disposed between the inlet end and the valve seat, and
  - a push rod extending from the valve seal and through the valve seat opening, the push rod substantially reduced in diameter intermediate its ends to permit maximum fluid flow through the passage;
- a spring for biasing the valve seal against the valve seat in a closed position of the valve, the spring engaging the walls of the passage for restricting movement of the valve seal to substantially axial movement relative to the opening defined by the valve seat;
- a shaft having a cam surface, the shaft rotatably mounted in the housing between the outlet end and the valve seat wherein the cam surface is adjacent the end of the push rod and with a substantial portion of the shaft positioned out of the passage to maximize fluid flow around the shaft when the valve is open;
- a lever handle external to the housing, the lever handle fastened to the ends of the shaft for rotating the shaft, the handle rotatable from a first position angled away from the housing wherein the valve is in the closed position to a second position substantially parallel to the housing for rotating the cam shaft and causing the cam surface to engage the end of the push rod and move the push rod toward the inlet end of the housing carrying the valve seal away from the valve seat to an open position of the valve;
- means for maintaining the lever handle in the second position, comprising
  - a latch pivotally mounted on the lever handle,
  - a roll pin secured to the housing adjacent the latch when the lever handle is in the second position, and
  - wherein the latch is accessible through an opening in the lever handle for pivoting the latch into releasable engagement with the roll pin for holding the handle in the second position;
- a blocking element having two ends, one end of the blocking element pivotally connected to the latch and the other end of the blocking element adapted to butt against a portion of the housing when the lever handle is in the first position for preventing movement of the lever handle; and
- a depression in the housing for receiving the pivoted end of the blocking element when the manipulator is depressed; and
- an abutment on the body adjacent the latch so that the blocking element is pivoted out of engagement with the housing when the pivoted end of the blocking element moves into the depression thus freeing the handle for rotation to the second position.

23. A fluid flow control apparatus as recited in claim 22, wherein the valve seal has an axial hole for slidably receiving the end of the push rod, the push rod further comprising an intermediate shoulder for engaging the valve seal upon reciprocation of the push rod toward the inlet end of the passage.

* * * * *